(12) United States Patent
Serena

(10) Patent No.: US 7,949,791 B2
(45) Date of Patent: May 24, 2011

(54) DEVICE AND METHOD FOR REPLACING TERMS IN DOCUMENTS WITH HYPERLINKS

(75) Inventor: Frank David Serena, Goleta, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 0 days.

(21) Appl. No.: 12/392,961

(22) Filed: Feb. 25, 2009

(65) Prior Publication Data

US 2009/0158133 A1 Jun. 18, 2009

Related U.S. Application Data

(63) Continuation of application No. 11/169,144, filed on Jun. 28, 2005, now Pat. No. 7,516,215, which is a continuation of application No. 09/507,967, filed on Feb. 22, 2000, now Pat. No. 6,912,571.

(51) Int. Cl.
*G06F 15/16* (2006.01)
(52) U.S. Cl. ........................................ 709/246; 709/217
(58) Field of Classification Search .................. 709/217, 709/246

See application file for complete search history.

(56) References Cited

U.S. PATENT DOCUMENTS

| | | | |
|---|---|---|---|
| 4,329,675 A | 5/1982 | Van Hulle | |
| 4,331,974 A | 5/1982 | Cogswell et al. | |
| 4,404,589 A | 9/1983 | Wright, Jr. | |
| 4,733,301 A | 3/1988 | Wright, Jr. | |
| 4,974,085 A | 11/1990 | Campbell et al. | |
| 5,335,344 A | 8/1994 | Hastings | |
| 5,337,947 A | 8/1994 | Eskandry | |
| 5,349,526 A | 9/1994 | Potts, Sr. et al. | |
| 5,361,098 A | 11/1994 | Lucas | |
| 5,369,442 A | 11/1994 | Braun | |
| 5,389,964 A | 2/1995 | Oberle et al. | |
| 5,424,785 A | 6/1995 | Orphan | |
| 5,508,754 A | 4/1996 | Orphan | |
| 5,532,735 A | 7/1996 | Blahut et al. | |
| 5,535,229 A | 7/1996 | Hain, Jr. et al. | |
| 5,535,329 A | 7/1996 | Hastings | |
| 5,539,471 A | 7/1996 | Myhrvold et al. | |
| 5,572,816 A | 11/1996 | Andeson, Jr. et al. | |
| 5,600,366 A | 2/1997 | Schulman | |

(Continued)

FOREIGN PATENT DOCUMENTS

WO WO 01/20481 3/2001

(Continued)

OTHER PUBLICATIONS

Information Today, Inc. "Flyswat 1.0", Jan. 1, 2000, 1 page.*

(Continued)

*Primary Examiner* — George C Neurauter, Jr.
(74) *Attorney, Agent, or Firm* — Samuel S. Lee; Procopio, Cory, Hargreaves & Savitch LLP

(57) ABSTRACT

A computer-implemented method of controlling content includes receiving an input from the user and monitoring content in an application program or content exchanged between the application program and an operating system residing at the user's computer system. The method includes determining whether monitored content corresponds to a predetermined advertisement. If the monitored content corresponds to the predetermined advertisement, the predetermined advertisement is replaced with another predetermined advertisement based on the user input.

4 Claims, 11 Drawing Sheets

U.S. PATENT DOCUMENTS

| | | | |
|---|---|---|---|
| 5,613,063 A | 3/1997 | Eustace et al. | |
| 5,659,351 A | 8/1997 | Huber | |
| 5,673,322 A | 9/1997 | Pepe et al. | |
| 5,678,041 A | 10/1997 | Baker et al. | |
| 5,696,898 A | 12/1997 | Baker et al. | |
| 5,706,507 A | 1/1998 | Schloss | |
| 5,708,478 A | 1/1998 | Tognazzini | |
| 5,715,018 A | 2/1998 | Fasciano et al. | |
| 5,732,216 A | 3/1998 | Logan et al. | |
| 5,748,894 A | 5/1998 | Ishizaki et al. | |
| 5,754,939 A | 5/1998 | Herz et al. | |
| 5,761,477 A | 6/1998 | Wahbe et al. | |
| 5,802,299 A | 9/1998 | Logan et al. | |
| 5,819,270 A | 10/1998 | Malone et al. | |
| 5,819,285 A | 10/1998 | Damico et al. | |
| 5,828,866 A | 10/1998 | Hao et al. | |
| 5,832,212 A | 11/1998 | Cragun et al. | |
| 5,835,701 A | 11/1998 | Hastings | |
| 5,838,790 A | 11/1998 | McAuliffe et al. | |
| 5,848,396 A | 12/1998 | Gerace | |
| 5,864,863 A | 1/1999 | Burrows | |
| 5,878,233 A | 3/1999 | Schloss | |
| 5,889,958 A | 3/1999 | Willens | |
| 5,893,095 A | 4/1999 | Jain et al. | |
| 5,896,536 A | 4/1999 | Lindsey | |
| 5,901,287 A | 5/1999 | Bull et al. | |
| 5,903,727 A | 5/1999 | Nielsen | |
| 5,905,248 A | 5/1999 | Russell et al. | |
| 5,918,014 A | 6/1999 | Robinson | |
| 5,930,792 A | 7/1999 | Rolcyn | |
| 5,937,390 A | 8/1999 | Hyodo | |
| 5,937,404 A | 8/1999 | Csaszar et al. | |
| 5,941,944 A | 8/1999 | Messerly | |
| 5,944,263 A | 8/1999 | Lucco et al. | |
| 5,945,989 A | 8/1999 | Freishtat et al. | |
| 5,948,061 A | 9/1999 | Merriman et al. | |
| 5,958,015 A | 9/1999 | Dascalu | |
| 5,959,623 A | 9/1999 | van Hoff et al. | |
| 5,961,603 A | 10/1999 | Kunkel et al. | |
| 5,973,683 A | 10/1999 | Cragun et al. | |
| 5,982,370 A * | 11/1999 | Kamper | 715/760 |
| 5,987,480 A | 11/1999 | Donohue | |
| 5,987,606 A | 11/1999 | Cirasole et al. | |
| 5,991,878 A | 11/1999 | McDonough et al. | |
| 5,996,011 A | 11/1999 | Humes | |
| 5,999,912 A | 12/1999 | Wodarz et al. | |
| 6,029,045 A | 2/2000 | Picco et al. | |
| 6,044,376 A | 3/2000 | Kurtzman, II | |
| 6,052,730 A * | 4/2000 | Felciano et al. | 709/225 |
| 6,061,659 A | 5/2000 | Murray | |
| 6,128,655 A | 10/2000 | Fields et al. | |
| 6,134,532 A | 10/2000 | Lazarus et al. | |
| 6,138,142 A | 10/2000 | Linsk | |
| 6,141,010 A | 10/2000 | Hoyle | |
| 6,144,944 A | 11/2000 | Kurtzman et al. | |
| 6,314,451 B1 | 11/2001 | Landsman et al. | |
| 6,324,553 B1 | 11/2001 | Cragun et al. | |
| 6,330,554 B1 | 12/2001 | Altschuler et al. | |
| 6,339,761 B1 | 1/2002 | Cottingham | |
| 6,341,306 B1 * | 1/2002 | Rosenschein et al. | 709/217 |
| 6,366,298 B1 | 4/2002 | Haitsuka et al. | |
| 6,385,592 B1 | 5/2002 | Angles et al. | |
| 6,397,246 B1 | 5/2002 | Wolfe | |
| 6,408,055 B1 | 6/2002 | Kokubun | |
| 6,412,011 B1 | 6/2002 | Agraharam et al. | |
| 6,424,981 B1 * | 7/2002 | Isaac et al. | 715/273 |
| 6,434,745 B1 | 8/2002 | Conley et al. | |
| 6,453,335 B1 | 9/2002 | Kaufmann | |
| 6,457,010 B1 | 9/2002 | Eldering et al. | |
| 6,459,440 B1 | 10/2002 | Monnes et al. | |
| 6,463,585 B1 | 10/2002 | Hendricks et al. | |
| 6,487,538 B1 | 11/2002 | Gupta et al. | |
| 6,505,169 B1 | 1/2003 | Bhagavath et al. | |
| 6,577,716 B1 | 6/2003 | Minter et al. | |
| 6,698,020 B1 | 2/2004 | Zigmond et al. | |
| 6,704,930 B1 | 3/2004 | Eldering et al. | |
| 6,799,326 B2 | 9/2004 | Boylan et al. | |
| 2002/0010757 A1 | 1/2002 | Granik et al. | |

FOREIGN PATENT DOCUMENTS

| | | |
|---|---|---|
| WO | WO 0120481 | 3/2001 |

OTHER PUBLICATIONS

Windows95.com "Browser", listing of computer programs available for download including "FlySwat", 7 pages.*

IBM Corporation. "Policy Based Offensive Content Substitution through Content Modification Proxy", Research Disclosure, vol. 41, Issue 415, Nov. 1998, 1 page.

F. David Serena, Advertising Replacement Business Plan Synopsis Meta-Boycott; Jan. 3, 2000, pp. 1-3.

Robert Wahbe et al., "Efficient Software-Based Fault Isolation", Computer Science Division, Univ. of CA, 1993, pp. 1-13.

* cited by examiner

DEVICE AND METHOD FOR REPLACING TERMS IN DOCUMENTS WITH HYPERLINKS

CROSS-REFERENCE TO RELATED APPLICATIONS

The present application is a continuation of co-pending U.S. patent application Ser. No. 11/169,144, filed Jun. 28, 2005. Benefit of priority of the above-referenced application with a filing date of Jun. 28, 2005 is hereby claimed, and the disclosure of this application is incorporated in its entirety herein. U.S. patent application Ser. No. 11/169,144 is a continuation of U.S. patent application Ser. No. 09/507,967 (now U.S. Pat. No. 6,912,571), filed Feb. 22, 2000. Benefit of priority of the above-referenced application with a filing date of Feb. 22, 2000 is hereby claimed, and the disclosure of this application is incorporated in its entirety herein.

TECHNICAL FIELD

This invention relates to content replacement, and more particularly to the replacement of an advertisement with another advertisement, other content, or no content.

BACKGROUND

Referring to FIG. 1, a multimedia computer system 100 is illustrated which represents a typical hardware setup for executing software that allows a user to perform tasks such as communicating with other computer users, accessing various computer resources, and viewing, creating, or otherwise manipulating electronic content—that is, any combination of text, images, movies, music or other sounds, animations, three-dimensional virtual worlds, and links to other possibly distributed objects. The system 100 includes various input/output (I/O) devices (mouse 102, keyboard 104, display or television screen 106, remote controller 108, printer 110) and a general purpose computer 112 having a central processor unit (CPU) 114, an I/O unit 116 and a memory 118 that stores data and various programs such as an operating system 120, and one or more application programs 122. The various I/O devices may be connected to the computer 112 via a wireless link (as shown by the dashed line for the remote controller 108) or a direct link.

The operating system 120 is a software program that manages the basic operations of a computer system. The operating system 120 determines how the computer main memory will be apportioned, how and in what order tasks assigned to it are handled, how it will manage the flow of information into and out of the main processor 114, how it will get material to a printer for printing, to the screen 106 for viewing, how it will receive information from the keyboard 104. In addition, the operating system 120 may manage the transfer of multimedia information to display devices. In short, the operating system 120 handles the computer's basic housekeeping. Examples of operating systems include MS-DOS, UNIX, PICK, MS-Windows, and Linux.

An application program 122 or application is a software program that carries out some useful task. Examples of applications include database managers, spreadsheets, communications packages, graphics programs, word processors, and browsers.

The computer system 100 also typically includes some sort of communications card or device 124 (for example, a telephone, computer network, or cable line). A content provider provides access to network content in a network 126 in addition to various services associated with the content. Examples of content providers include AT&T WorldNet, UUNet, and America Online.

Additionally, for multimedia computer systems, a user of the system 100 can watch television or view web pages and otherwise "surf" the Internet. In this regard, the computer 112 might include a special purpose computer, referred to as a set top device that is used in connection with television sets for viewing web pages on the Internet. In such a special purpose computer, a television tuner 128 is included for receiving broadcast and/or cable television signals 130. The monitor in such a multimedia system might correspond to a computer monitor, a television monitor, or any combination of both.

As shown in FIG. 2, a user of the computer system 100 can access electronic content or other resources either stored locally at the user's own client system 202 (for example, a personal or laptop computer) or remotely at one or more server systems 200. An example of a server system is a host computer that provides subscribers with online computer services such as, for example, e-mail, e-commerce, chat rooms, Internet access, electronic newspapers and magazines. Users of a host computer's online services typically communicate with one or more central server systems 200 through client software executing on their respective client systems 202. This may or may not include proxy server functionality. Thus, the user of the client station 202 may connect to the server 200 via a traditional modem 204, a special integrated service digital network (ISDN) modem 206, or via a TCP/IP protocol 208.

In practice, a server system 200 typically will not be a single monolithic entity but rather will be a network of interconnected server computers, possibly physically dispersed from each other, each dedicated to its own set of duties and/or to a particular geographical region. In such a case, the individual servers are interconnected by a network of communication links, in known fashion.

As mentioned above, one type of application program is a browser. A browser is an example of client software that enables users to access and view electronic content stored either locally or remotely, such as in a network environment (local area network (LAN), intranet, Internet). A browser typically is used for displaying documents described in Hyper-Text Markup Language (HTML) and stored on servers connected to a network such as the Internet.

A user instructs a browser to access an HTML document, or web page, by specifying a network address—or Uniform Resource Locator (URL)—at which a desired document resides. In response, the browser contacts the corresponding server hosting the requested web page, retrieves the one or more files that make up the web page, and then displays the web page in a window on the user's screen 106.

FIG. 3 is a screen shot of a browser application 300 (Internet Explorer) displaying a typical HTML document, or web page 302. As shown therein, a single web page may be composed of several different files potentially of different data types 304 (for example, text, images, virtual worlds, sounds, or movies). In addition, a web page can include links 306, or pointers, to other resources (for example, web pages, individual files, or broadcast television stations) available on the network or through the television signal 130. Each link has an associated URL pointing to a location on the network. When a user clicks on, or otherwise selects a displayed link, the browser automatically will retrieve the web page or other resource corresponding to the link's associated URL and display it to, or execute it for, the user.

An advertisement 308 is displayed in the browser application 300 for VISA. In this case, the originator of content (presumably VISA) displays an image of a VISA card (which resembles the VISA logo) along with a graph of annual percentage rates associated with credit cards.

Content filtration systems may be used to manage and/or present content choices to the user. One example of such a system is a portal which convinces users to visit the portal web site and provides, at a minimum, search engines, free e-mail, instant messaging and chat, web hosting. Content filtration systems could provide a user with content from selected channels and sources by automatically delivering the content to the user's computer via the Internet at user-specified intervals (referred to as "push" delivery). Some content filtration systems prompt the user to actively rank content choices (both likes and dislikes).

A content filtration system may monitor, block and even report content usage to the user or another user that supervises the user. The content filtration system might block or deny content that the supervisory user or the user finds inappropriate, for example, vulgar language, pornography, or hate literature. The content filtration system might provide a protective or defensive gateway to certain users—for example, a firewall limits exposure of a computer or group of computers to an attack from outside. Firewalls are often used on a local area network (LAN) connected to the Internet. The firewall enforces a virtual boundary between two or more networks.

SUMMARY

Various implementations may include one or more of the following features.

In one implementation, a computer-implemented method of controlling content includes receiving input from a user and monitoring content in an application program or content exchanged between the application program and an operating system residing at the user's computer system. The method includes determining whether monitored content corresponds to a predetermined advertisement. If the monitored content corresponds to the predetermined advertisement, the predetermined advertisement is replaced with another predetermined advertisement based on the user input.

Because an advertisement is replaced based on user input, the method provides the user with a way of obtaining more useful and relevant information. For example, an advertisement for a remote company may be replaced with an advertisement for a company local to the user. Furthermore, entities related to the advertisements may agree upon the replacement technique and effectively act to co-brand each other. This provides one of the entities with the ability to reach out to users that wouldn't normally be reached.

In another implementation, a method of filtering content relating to an originator of content includes receiving input from a user selecting an arbitrary originator of content and receiving a request from the user at a computer for an internetwork page. The method includes determining whether the internetwork page includes content relating to the originator. If the internetwork page includes content relating to the originator, the related originator content is replaced with other predetermined content.

Because a user is able to select an arbitrary originator of content, the user is enabled to effectively "boycott" or ignore electronic content relating an originator of content, thus ignoring all goods and services provided by the originator of content through the internetwork.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 4:
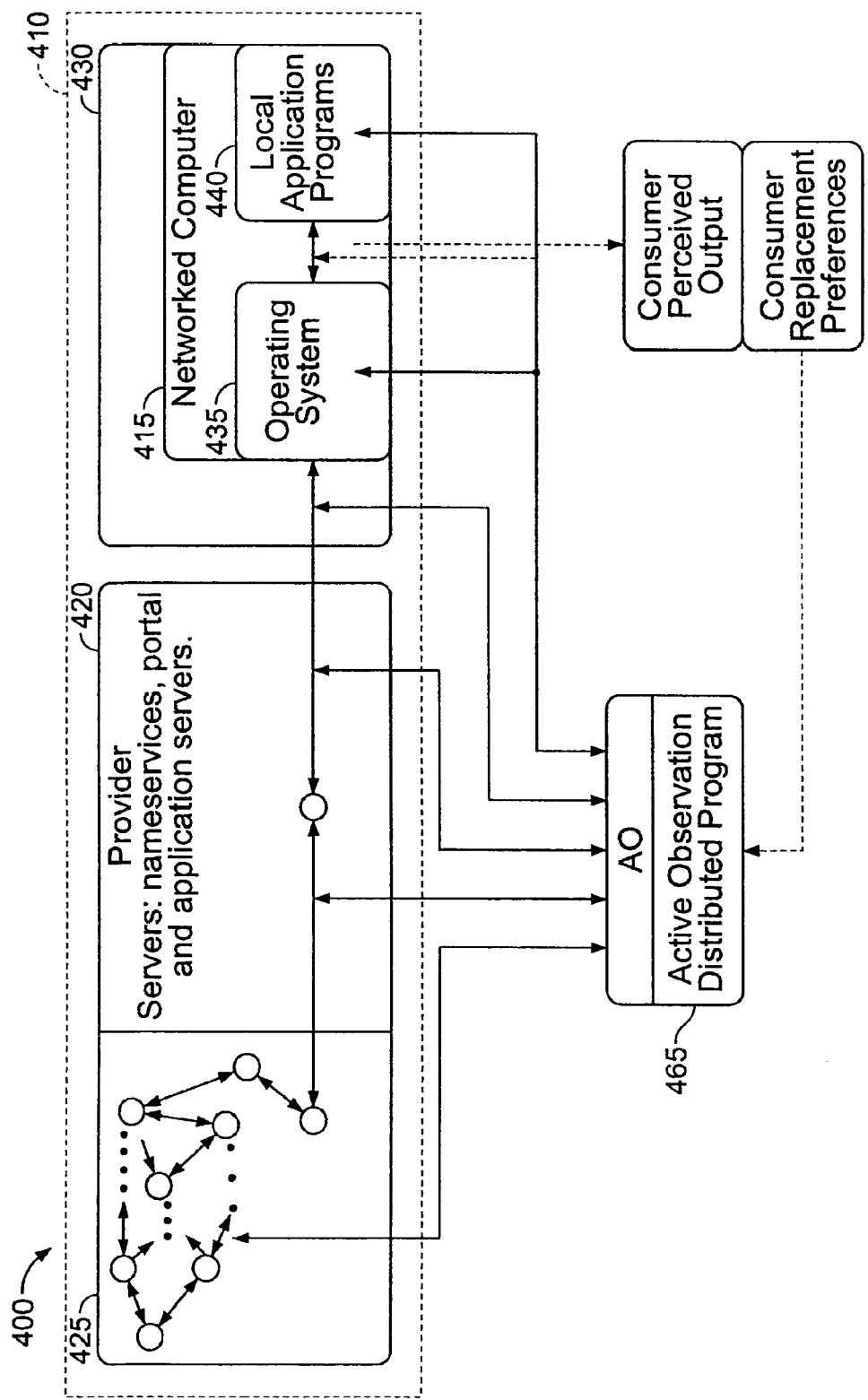
FIG. 4 is a block diagram of a content control system according to the invention.

Referring to FIG. 4, a system 400 may be used to recognize data or content that a user might experience and replace the recognized data with substantive data, information, or content. This system 400 operates with the complete support, legal authority, and command of the user, based on the user's objectives.

Figure 1:
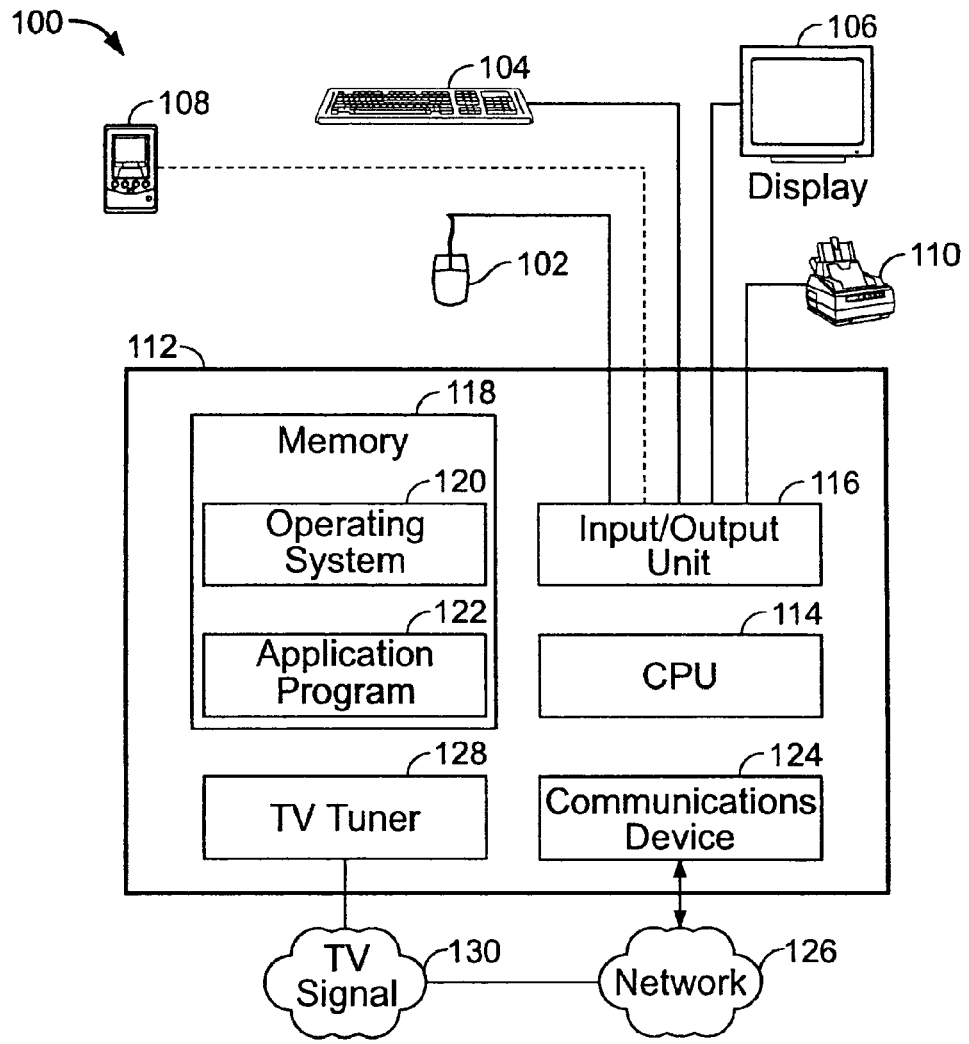
FIG. 1 is a block diagram of a multimedia computer system.
Figure 2:
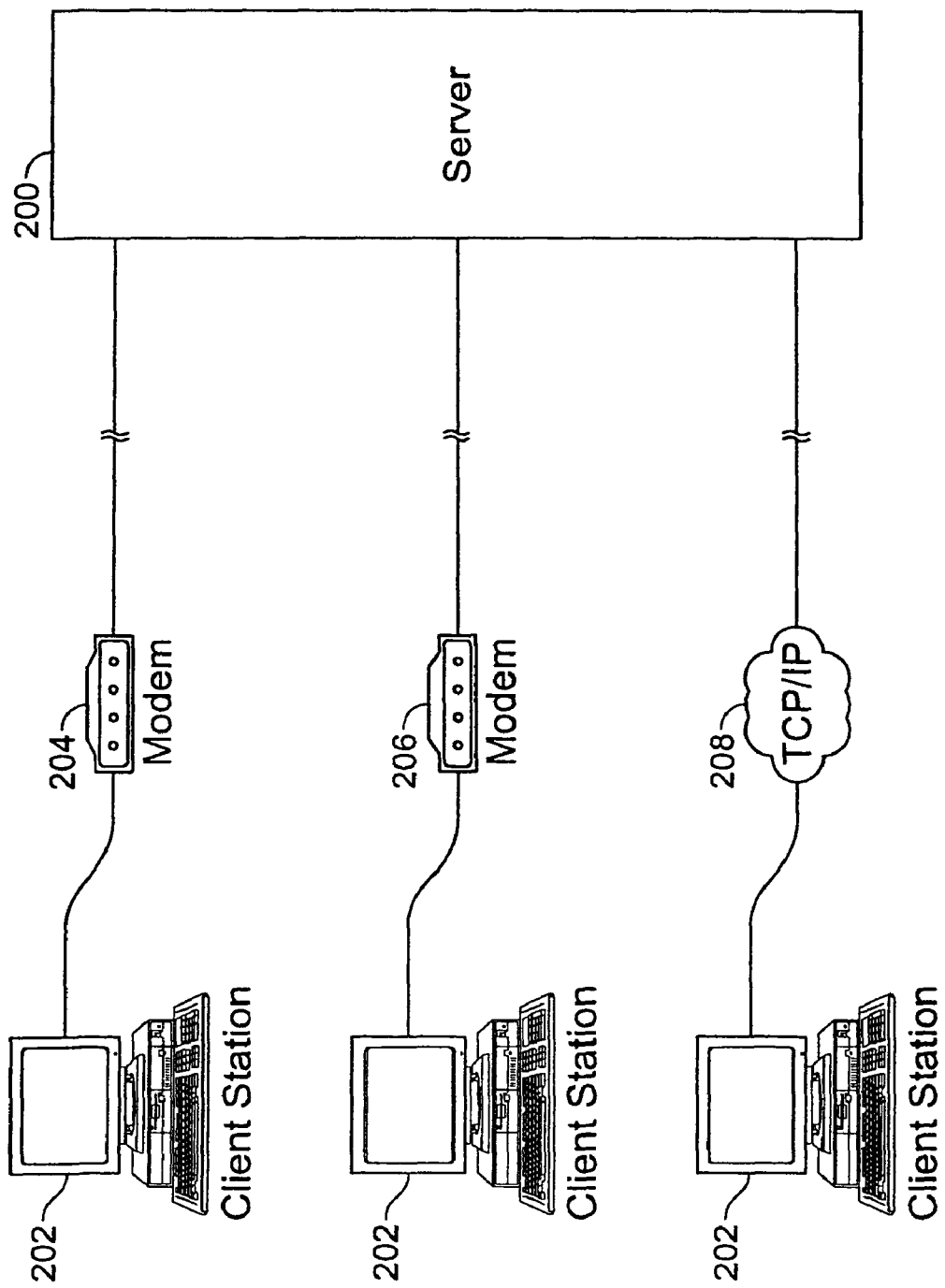
FIG. 2 is a block diagram of a typical network computing environment.
Figure 3:
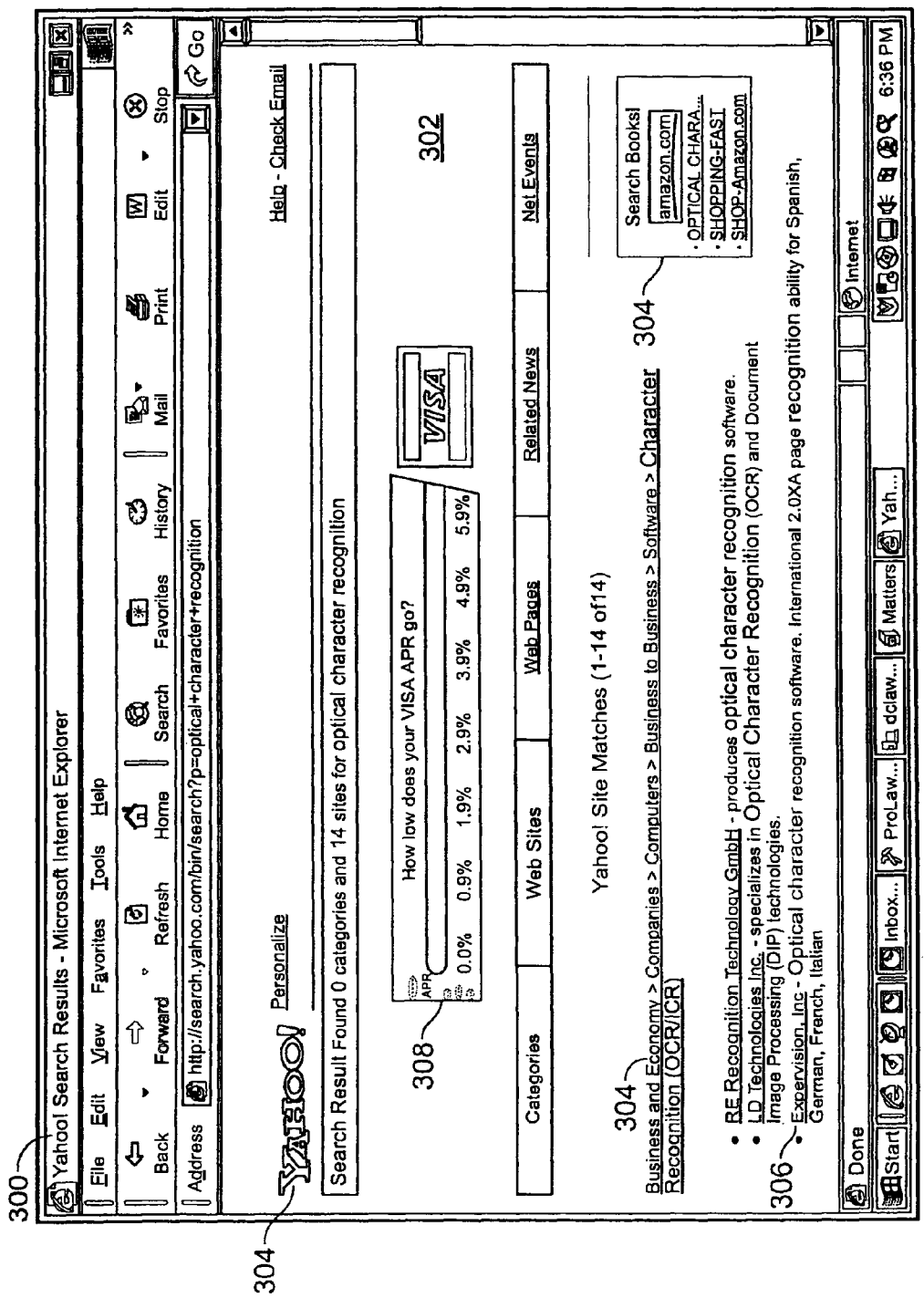
FIG. 3 is a screen shot of a browser displaying a web page.

In FIG. 4, an observation program 405 is implemented by and stored at a computer to observe events that occur in a computer system 410. The observation program 405 may reside at one or more locations in the computer system 410. For example, the observation program 405 may reside at a user's client computer 415. The user's client computer 415 includes any computer system such as the computer system of FIG. 1. Thus, the client computer 415 may be a desktop personal computer, a laptop computer, a networked computer, a cellular telephone, or a personal data/digital assistant.

If the client computer 415 is connected to a network, then the user's client computer 415 makes requests from a server computer 420 that provides services to one or more other computer programs 425, for example, name services, portal and application servers, electronic mail, and Internet service. The user can then access information or documents through the server computer 420 using, for example, a dial-in technique, a local area network (LAN), a cable TV modem, a networked computer, an internetwork TV hybrid connection, an online service provider, an ISDN line, SLIP or PPP modems, a dumb terminal, or a terminal emulation technique. For example, a web browser at the user's client computer 415 might request HTML files from the network server computer 420.

The observation program 405 may reside at a server computer 420. For example, the observation program 405 may reside at a proxy server that acts as an intermediary between the user's computer 415 and the Internet so that the originator of information can ensure security, administrative control, and caching service to the user. As another example, the observation program 405 may reside at a firewall server that protects resources of a private network from other networks. For example, if the user's computer 415 is part of an intranet 430 that allows its workers access to the wider Internet, the intranet may use a firewall server that prevents outsiders from accessing its own private data resources and for controlling what outside resources its own users have access to. The observation program 405 may be distributed over more than one computer, or over a network.

Examples of an observation program 405 include a kernel module, an application, a dynamic link library (dll), a dynamically loaded library, and/or an application device driver. The observation program 405 may communicate with the computer system 410 and in particular, the user's computer 415 and the server computer 420, using mechanisms such as application kernel calls, dynamic data exchange (DDE), direct RAM memory access, Windows tags, Windows event and messages.

The user's computer 415 includes, among other features, an operating system 435 that manages the basic operations of the computer 415 and one or more local application programs 440 that perform some useful tasks.

An example of how the system 400 might be implemented is now discussed. A user accessing a financial planner application program residing at the user's computer 415 permits an observation program 405 to monitor information exchanged between the financial planner application and the user's operating system 435. When the observation program 405 detects the presence of an advertisement for a first bank, the observation program 405 removes the advertisement (and therefore prevents it from reaching the user) and replaces the advertisement for the first bank with an advertisement or service for a second bank (which presumably has more relevant or useful information for the user). In this situation, perhaps the first bank has an agreement with the financial planner that permits a financial planner application user to directly download information relating to the first bank's services and trades. However, the second bank, because it is too small or too local, may not have such an agreement with the financial planner. Thus, the user receives information about the second bank rather than the first bank. If the received information includes an advertisement, then the system effectively co-brands the first and second banks.

Such a system saves the second bank money because it need not set up an agreement with the financial planner. The first bank might provide this service to one or more other banks and use this service to negotiate a better deal with the purveyor of the financial planner. The financial planner may benefit from having fewer (but more lucrative) customers to interact with.

In another implementation, the user might access a web site operated by the financial planner. In this case, the observation program 405 could monitor content at the web site and replace an advertisement relating to the first bank with an advertisement relating to the second bank.

Figure 5:
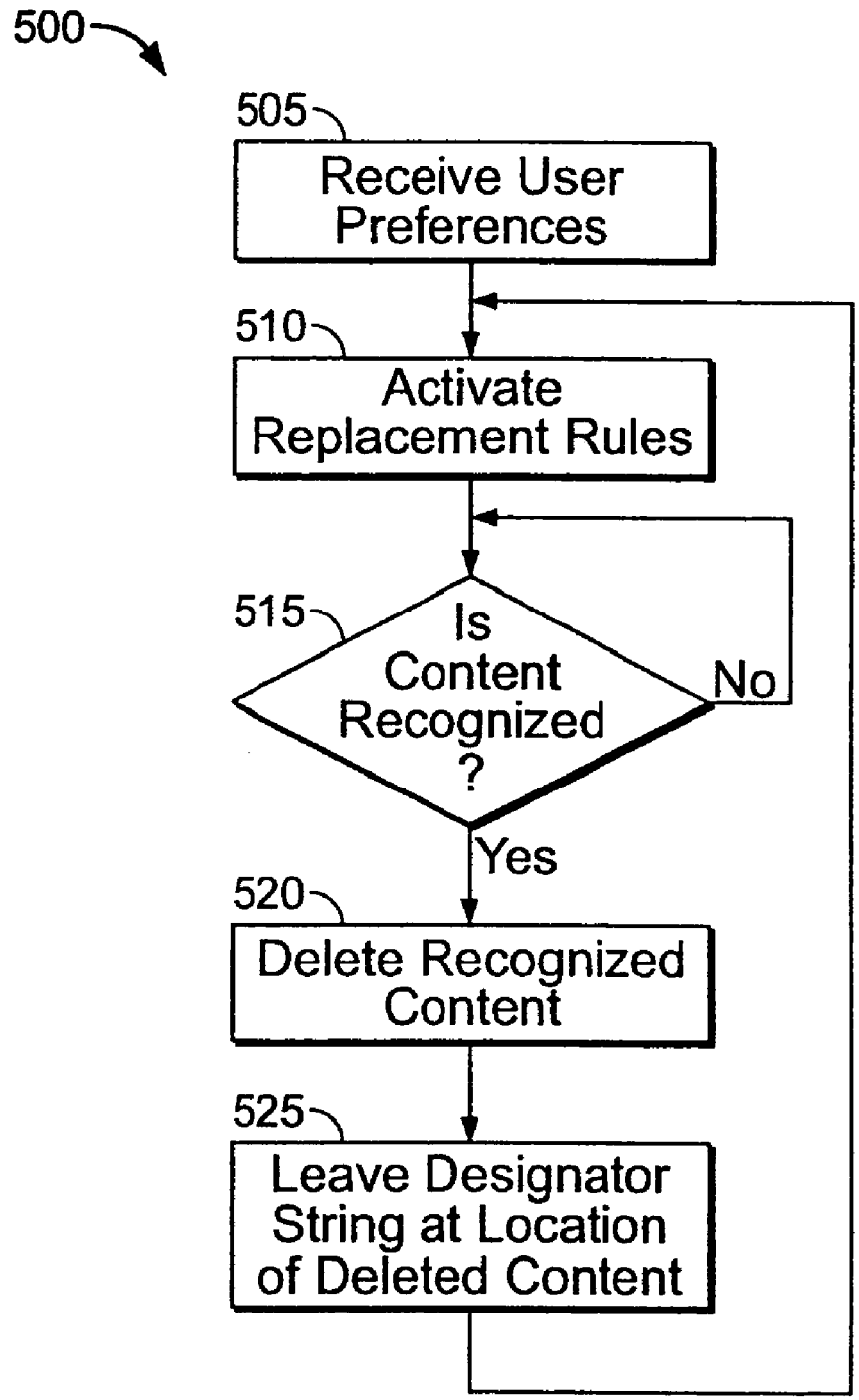
FIGS. 5 and 12 are flow charts of procedures for recognizing and removing content in the content control system of FIG. 4.

Referring also to FIG. 5, the observation program 405 performs a procedure 500 for recognizing content in the network computer system 410. Content to be recognized may be content exchanged between the operating system 435 and the local application program 440, between the operating system and the server 420, between the server 420 and one or more remote applications 425, and between documents within the remote applications. Content to be recognized may be content accessed by the operating system 435, the application program 440, or the server 420.

Content includes, for example, text, video, sounds, images, or movies. Furthermore, content may include information associated with an originator of content. For example, an advertisement or notice is content that is designed to attract public attention or patronage. An advertisement generally calls public attention or patronage to a product, service, or business. An advertisement includes logos on application programs as well as icons on a desktop. Advertisements also include text, text placed in a hyper-tag, or text replaced with a hyper-tag.

The observation program 405 receives user preferences (step 505). Preferences from the user indicate some information about the content that the user wishes to control in addition to some information about the user. The observation program 405 may receive the content preferences at any time and from sources other than the user. For example, the user may enter content preferences during a special enrollment period or during regular operation of the user's computer system 415. Likewise, the user may enter preferences at any time during regular operation of the user's computer system 415 by opening a preference selection application in the observation program. Preferences may be received by an organization separate from user input—thus, they may be updated at any time by the organization.

Preferences may be generated automatically by the observation program or at another server by a preference server and then accessed by the observation program. When generating the preferences, the preference server could observe information relating to the user and generate the preferences based on these observations. For example, the preference server might generate a profile of the user that includes a location of the user, a time the user accesses content, or a history of user interests. The preference server may set up a preference for a bank that is physically nearer to the user. The idea here is that the user would be more likely to interact with content relating to a local bank than with content relating to a national or remote bank. Alternatively, many local banks may combine their resources to advertise only to those users determined to be in a same virtual (for example, based on IP address) or geographic region or place.

Figure 6:
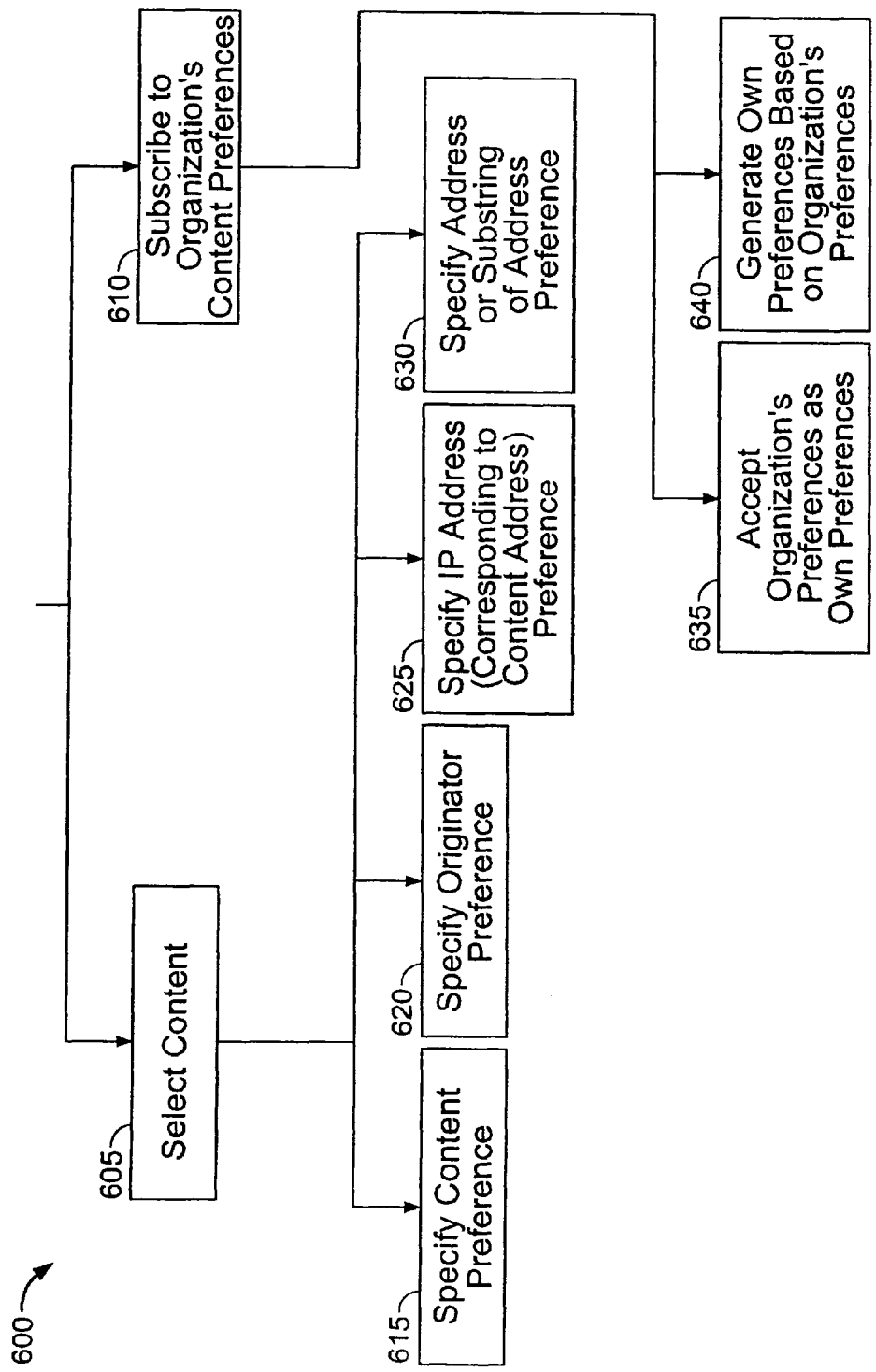
FIG. 6 is a flow chart of a procedure for setting user preferences in the content control system of FIG. 4.

Referring also to FIG. 6, the user performs a procedure 600 for generating content preferences. The user may select content for the application program that is observed (step 605) or the user may subscribe to an organization's or someone else's content preference (step 610). When the user selects the content, the user may specify the content (step 615) when wishing to block the content. The user could specify the originator of the content (step 620) when wishing to block all content that originates from the originator of the content. When the application program is a network browser, the user could specify the Internet protocol (IP) address that identifies a particular device from which the content originates and a particular network from which the content originates (step 625). The user specifies the IP address when wishing to block all content that originates from the same network or device. The user could specify a file address (for example, a uniform resource locator (URL) address) or some substring of the file address (step 630) when wishing to block all content that originates from the same file.

Figure 7:
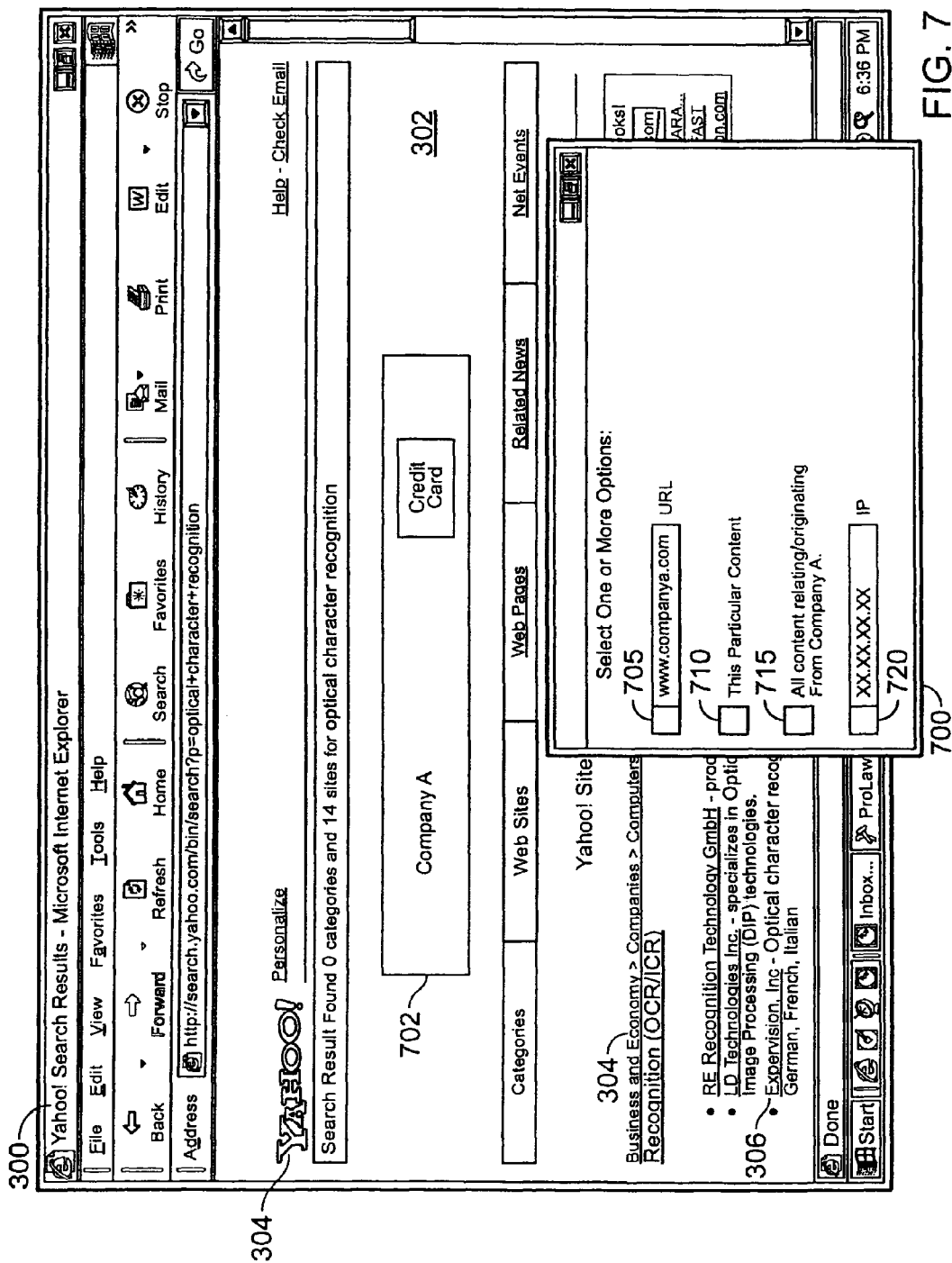
FIG. 7 is a screen shot of a browser displaying a preference window for setting user preferences in the content control system of FIG. 4.

Referring to FIG. 7, an example of how such a content selection is implemented is displayed in a network browser as a separate preferences window 700. When the user first observes a Company A advertisement 702, if the user wishes to control content relating to observed advertisement, the user selects the advertisement by, for example, meta-clicking (for example, alt-shift click) on the advertisement. The preference window 700 indicates to the user the different options for preferences relating to that content. The user may click on one or more of the appropriate boxes indicates such preferences—a box 705 selecting the URL or a substring of the URL address 705, a box 710 selecting the advertisement itself, a box 715 selecting all content originating from the originator of that advertisement, and a box 720 selecting the IP address.

Referring again to FIG. 6, the user may agree to accept content preferences indicated by another organization—such a situation might occur with the financial planner observation program described above. In that case, the user would agree to the first bank's content preferences. Then, the first bank would implement the observation program at the will of the user. As a still further example, the other organization could be a special interest organization, such as, for example, an anti-smoking organization. The anti-smoking organization might have a list of content providers and/or content that it considers as being contrary to their set of beliefs. Thus, if the user agrees to accept the anti-smoking organization's preferences, then content originating from cigarette producers and/or their affiliates might be removed.

The user content preferences may be a set intersection, complement, or union of the content preferences entered directly by the user and the content preferences controlled by the other party or organization.

Figure 8:
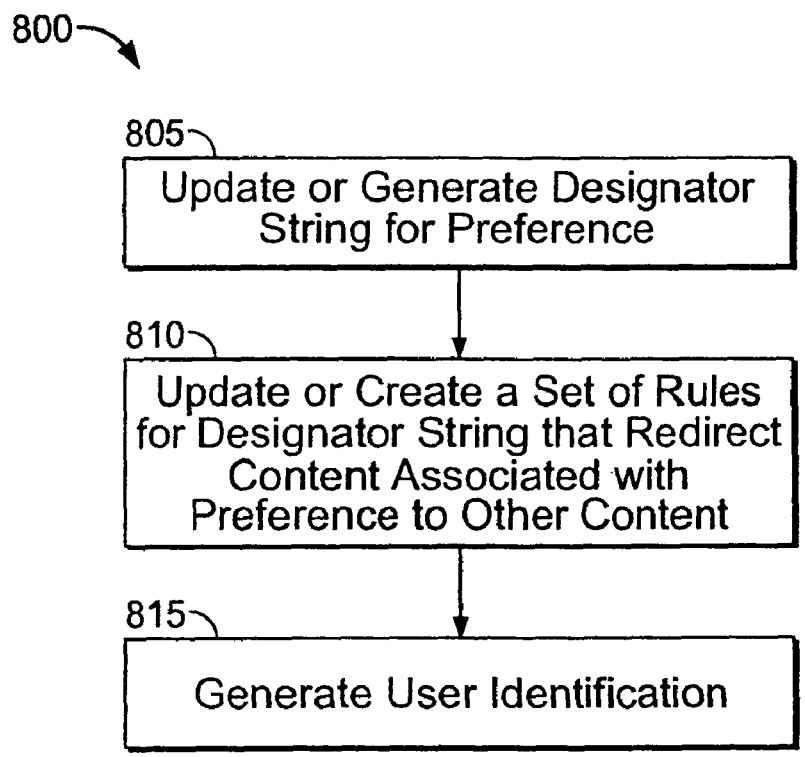
FIG. 8 is a flow chart of a procedure for activating a set of replacement rules in the content control system of FIG. 4.

Referring again to FIG. 5, after the observation program 405 receives the user preferences at step 505, the observation program 405 activates replacement rules based on the user preferences (step 510). Referring to FIG. 8, the observation program performs a procedure 800 for activating replacement rules. Designator strings for content are automatically generated and updated by the observation program (step 805) and saved into memory for future access by the observation program or any program that might replace the content. Typically, the designator string would be unique for the particular content and userID set. Once the designator strings are generated, a set of replacement rules for that designator string are updated or created (step 810). Furthermore, the observation program may generate a user identification (userID) based on the information entered by the user (step 815). The userID is implemented when more than a single user is controlled by the observation program. This is particularly relevant when the observation program is implemented apart from a user's computer, for example, at a proxy server. In that case, the observation program monitors and implements the requests of many users and/or the user's corresponding political, corporate, or affinity groups.

Figure 9:
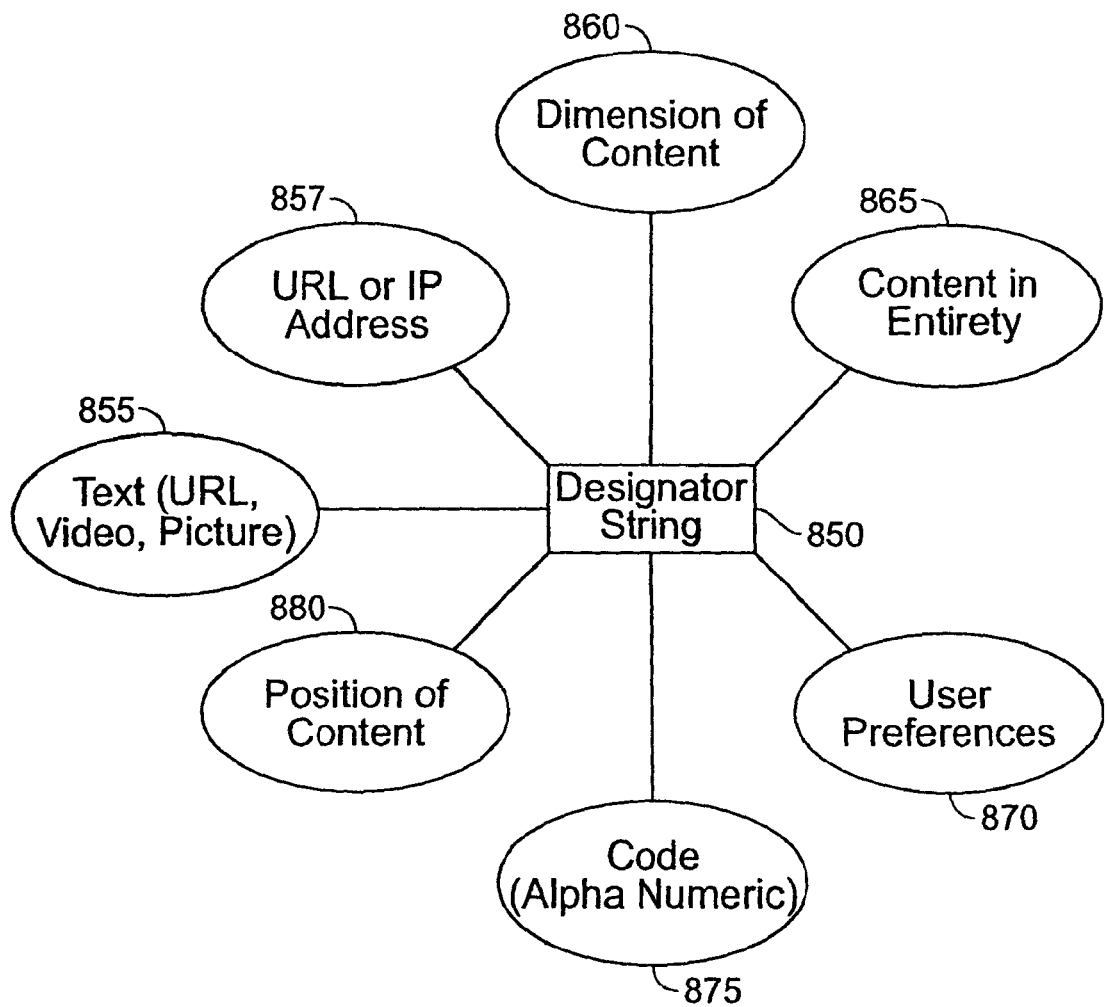
FIG. 9 is a block diagram of different types of designator strings for removed content.

As shown in FIG. 9, a designator string 850 may include text 855 associated with the content, for example, text in a URL, video, or image. Using the example of FIG. 7, a possible substring of the text designator string for the Company A advertisement 702 might be "companya". A designator string 850 may include an address 857 associated with the content if the content includes an address that would redirect the user to another location, for example a URL or IP address. Using the example of FIG. 7, if the Company A advertisement 702 provided a link to another web page with information about a credit card from Company A, then a possible URL designator string for Company A advertisement 702 may be www.companya.com.

A designator string 850 may include a dimension of content 860 in the displayed image. For example, in FIG. 7, a dimension designator string may be 4.6×1.1. A designator string 850 may include the content in its entirety 865. If the content is a simple image or text, then this is more practical.

For the Company A advertisement 702, the content designator string would include the whole displayed image. A designator string 850 may include an identification 870 preferred by the user. For example, in the example of FIG. 7, perhaps the user prefers to use an image designator string of an image designator (which is included in the advertisement 702) instead of the whole image. For example, the image designator string may correspond to a credit card logo for an advertisement originating from a credit card company. A designator string 850 may include an alphanumeric code 875 that is selected to correspond to the content. For example, the designator string for the Company A advertisement 308 may be the code "63400344". A designator string 850 may include a position 880 of the content in the display or in the file. For example, the designator string for the Company A advertisement 702 may be a position (4.4, 1.1). A designator string may be any combination of the above-described designator strings implemented by string concatenation. For example, the designator string for the Company A advertisement 702 may contain as a substring a position (4.4, 1.1) and/or a dimension 4.6×1.1.

Replacement rules are a set of groups of content to be removed, content to be inserted, and rules between them. The rules define actions that should take place when specific content is detected by the observation program 405 and actions that should take place to replace the detected content with other content. The rules are written into a memory that is either local to the user's computer or remote from the user's computer. In any case the rules are accessed by the observation program 405 or any server that would be involved in the replacement of content.

Rules take the form of a logic sentence, for example,
"If content1 is detected and if userID=33944, remove content1 and insert designator string451."
"If content1 is detected, if content3 is detected, and if userID=52939, remove content1 and insert designator string238."
"If address65 is detected and if userID=16620, remove content from address65 and insert designator string887."
"If originator499 is detected and if userID=99232, remove content from originator499 and insert designator string333."
"If designator string=designator string453 and if userID=31109, insert content 656."

Rules have one general form that indicates if a predetermined content for a particular user is detected, remove content from application program and replace content with its corresponding designator string. Rules have another general form that indicates if a particular designator string for a particular user is detected, insert other content. Rules may also include branch conditionals and/or statements that direct execution of the observation program.

Referring again to FIG. 5, the observation program 405 determines whether a predetermined content is detected (step 515). The observation program 405 monitors for the predetermined content in a communication channel between the application program 440 and the operating system 435, between the operating system 435 and the server 420, between different files accessed on the network 425 by the operating system 435, between the server 420 and the files on the network, at the operating system 435, or at the application program 440.

In the case of monitoring content in an Internet connection, the observation program 405 may intercept TCP/IP protocol packets and act as the intermediary between the Internet and the user's computer 415. The observation program would then determine whether the TCP/IP protocol packets, after sufficient sequencing and reassembly, include predetermined content.

The observation program 405 may recognize content using visual, semantic, lexical, or any combination of visual, lexical, and semantic techniques. Thus, the observation program may use one technique to recognize visual content and another technique to recognize lexical content.

In detecting visual images, the observation program may extract an identifier x from the visual image—such an identifier x could be a sequence of bits from the visual image. The observation program could, using a transform function H, transform this identifier x into an address H(x) that depends on the identifier x. Preferably, such a transformation H(x) would be relatively efficient to compute and would result in a unique address H(x). If the detected address H(x) matches more than one of a set of predetermined addresses (each address corresponding to predetermined content to be blocked), then further information is required. In this case, the entire or some part of the predetermined content may be accessed. However, most likely the detected address H(x) would either match none of the predetermined addresses or match one of the predetermined addresses. If the detected address H(x) matches none of the predetermined addresses, the observation program continues to determine if a predetermined content is recognized (step 515).

The transform function H could be one of several different functions, and selection of the particular transform function may be based on factors such as content detection efficiency or content detection speed. One example of a possible transform function H is a mid-square transfer function. The mid-square transfer function squares the identifier x obtained from the analyzed content and then extracts an appropriate number of bits from the middle of the squared value to obtain a final address H(x). The choice of the number of bits extracted from the middle of the squared value can be chosen to be any number—the greater the number of bits, the greater the chance that the resultant final address H(x) is unique to that content. Another example of a transform function H is a division transfer function that is equal to the remainder of the identifier x divided by some number M.

The transform function H could be a folding transform function that partitions the identifier into several parts, each part being of the same length except for the last, adds the parts together, and then extracts an arbitrary number from the added parts to obtain the address. For example, if the identifier were 110101010011110, then 110+101+010+011+110 would yield the address. The observation program can analyze the visual image most quickly using the folding transform function.

The observation program may use the transform function H to detect a predetermined content other than visual images. For example a large block of text may be transformed in a similar way as a visual image. As known to those skilled in the art, such transform functions described above are quite sensitive to small changes in a bit sequence. If there is a slight modification to the original bit sequence or bit sequence errors, an alternative function may be selected to mitigate the effect of such random or deliberate changes to the incident bit sequence. Other techniques such as content based retrieval, segmentation, or extraction of feature attributes known to those skilled in the art may be applied instead of the above referenced function.

The observation program may use optical character recognition (OCR) techniques to detect the predetermined content. In this case, the observation program may recognize characters in the predetermined content. During OCR processing, the observation program analyzes the image for light and dark areas in order to identify each alphabetic letter or digit. When a character is recognized, it may be converted into an ASCII code.

The observation program may use a parsing algorithm to recognize lexical information. Subsequent to OCR or visual images, embedded natural language may be parsed. The observation program would then break up the content (for example, the nouns (objects), verbs (methods), and their attributes or options) into parts that can then be managed by other programming. The observation program may also check to see that all input has been provided that is necessary.

The observation program may recognize images using a database lookup technique. Thus, previously identified content may be stored into a database and the observation program would search this database using any of the well known searching techniques, such as index key lookup, OCR, or computer vision algorithms. In index key lookup, an index key generated for the image is searched for in an index database. Furthermore, the observation program may recognize some content based on other similarly recognized content. Another example of a database lookup technique is a training image technique. In this technique, a detected image may be classified as being similar or very different from a set of training images. For example, one may compile a large number of images of an object like the White House. Any detected image may then be classified as either "containing the White House" or "not containing the White House". The observation program may take into account the position or relative position of the content on a given page for recognition purposes.

As described above, the observation program 405 may, based on the received user preferences, search for predetermined content in a text string of the URL 630, in an IP address corresponding to the URL 625, in the originator of content 620, or in the content itself 615. All of the recognition techniques discussed above may be used to detect predetermined content in any of these forms. For example, a string comparison may be used to detect a text string or substring of the URL or an IP address.

Since the URL frequently indicates the originator of content through the domain name, the text in the URL is often useful when recognizing content. Additionally, if only the IP address is provided, then name server lookup of the domain may be necessary to determine an originator of content. Within the content itself, OCR and/or logo recognition may be employed to detect a brand associated with the content. It should be noted that an originator of content may or may not be associated with the brand associated with the content. For example, GTE may be an originator of an advertisement for a product from IBM. Moreover, the service provider or the content provider may be the originator of content.

If the observation program recognizes content as predetermined content (step 515), then the observation program 405 proceeds to remove the recognized predetermined content from the file accessed by the user (step 520).

Once the observation program 405 has targeted and removed the content for replacement, the observation program determines the designator string according to the replacement rules and using the userId and preferences. Thus, the observation program 405 would then insert the designator string 850 into the file to be received by the user (step 525).

Figure 10:
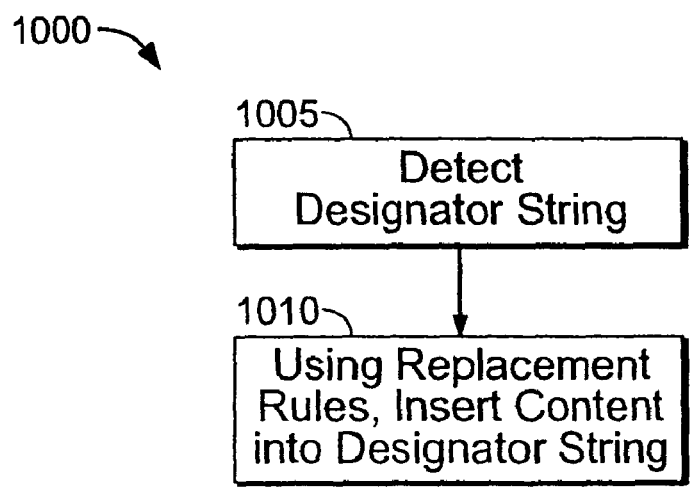
FIG. 10 is a flow chart of a procedure for inserting new content into a user-accessed document.
Figure 11:
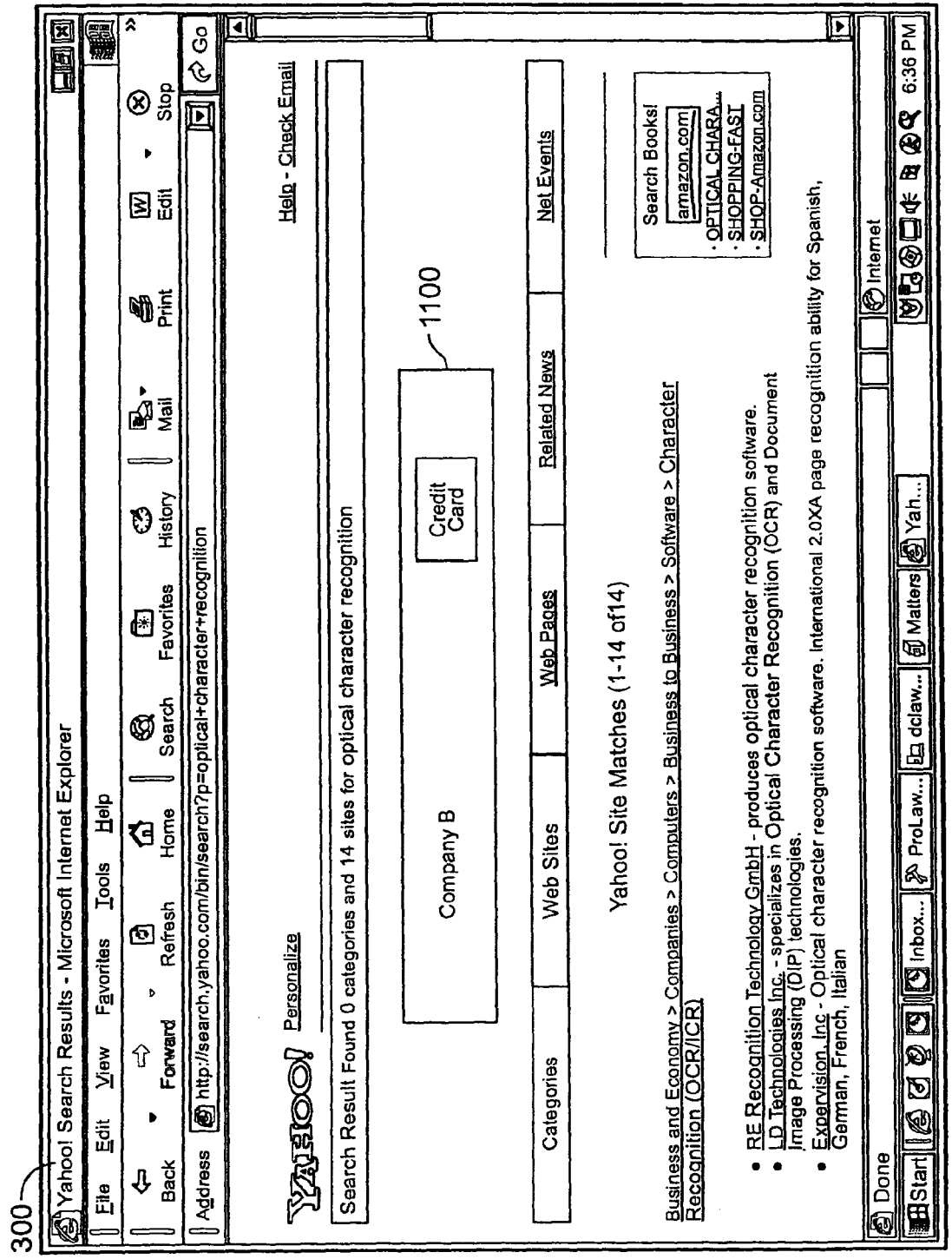
FIG. 11 is a screen shot of a browser displaying inserted new content.

Referring also to FIG. 10, once the designator string 850 is inserted into the file, a replacement server (such as the server 420, the observation program 405, or some other server accessed by the computer system 410) may perform a procedure 1000 to replace the designator string 850 with a replacement content. For example, if the designator string 850 is a URL address 857 such as the www.companya.com address used in the example of FIG. 7, then the replacement server may replace that URL address with another address such as www.companyb.com and insert an advertisement link 1100 for a Company B credit card, as shown in FIG. 11. As another example, if the designator string 850 for the Company A advertisement is an alphanumeric code, then the replacement server may replace the alphanumeric code with a Company B credit card advertisement, as shown in FIG. 11.

The replacement server first detects the presence of the designator string (step 1005) using any visual or lexical techniques that are described above with respect to detecting the predetermined content. For example, the replacement server could search the document for a code that would indicate the removed content and/or the content to be inserted in place of the removed content. Then, using the replacement rules, the replacement server inserts a replacement content (step 1010).

The replacement content can be cached on the user's computer or it can be read over the network by the replacement server. The replacement content may be white space—that is, the replacement server may simply remove the designator string. Or, in the case of graphical or visual information, the replacement content could be white space of a specified dimension. The replacement content could be a decorative image of a specified dimension.

The techniques for content replacement detailed above may be used by a consumer wishing to remove all content from a particular source, and in effect boycotting all content from that source. For example, if the consumer wishes to boycott a company that sells fur coats, the consumer could use the techniques for content replacement to remove all content coming from that company.

The techniques, methods, and systems described here may find applicability in any computing or processing environment in which electronic content may be viewed, accessed or otherwise manipulated.

Various implementations of the systems and techniques described here may be realized in digital electronic circuitry, or in computer hardware, firmware, software, or in combinations thereof. A system or other apparatus that uses one or more of the techniques and methods described here may be implemented as a computer-readable storage medium, configured with a computer program, where the storage medium so configured causes a computer system to operate on input and/or generate output in a specific and predefined manner. Such a computer system may include one or more programmable processors that receive data and instructions from, and transmit data and instructions to, a data storage system, and suitable input and output devices.

Each computer program may be implemented in a high-level procedural or object-oriented programming language, or in assembly or machine language if desired; and in any case, the language may be a compiled or interpreted language. Suitable processors include, by way of example, both general and special purpose microprocessors.

Generally, a processor will receive instructions and data from a read-only memory and/or a random access memory. Storage devices suitable for tangibly embodying computer program instructions and data include all forms of non-volatile memory, including semiconductor memory devices, such as EPROM, EEPROM, and flash memory devices; magnetic disks such as internal hard disks and removable disks; magneto-optical disks; and CD-ROM disks.

Any of the foregoing may be supplemented by, or implemented in, specially-designed ASICs (application-specific integrated circuits).

A number of embodiments of the present invention have been described. Nevertheless, it will be understood that various modifications may be made without departing from the spirit and scope of the invention. Accordingly, other embodiments are within the scope of the following claims.

Figure 12:
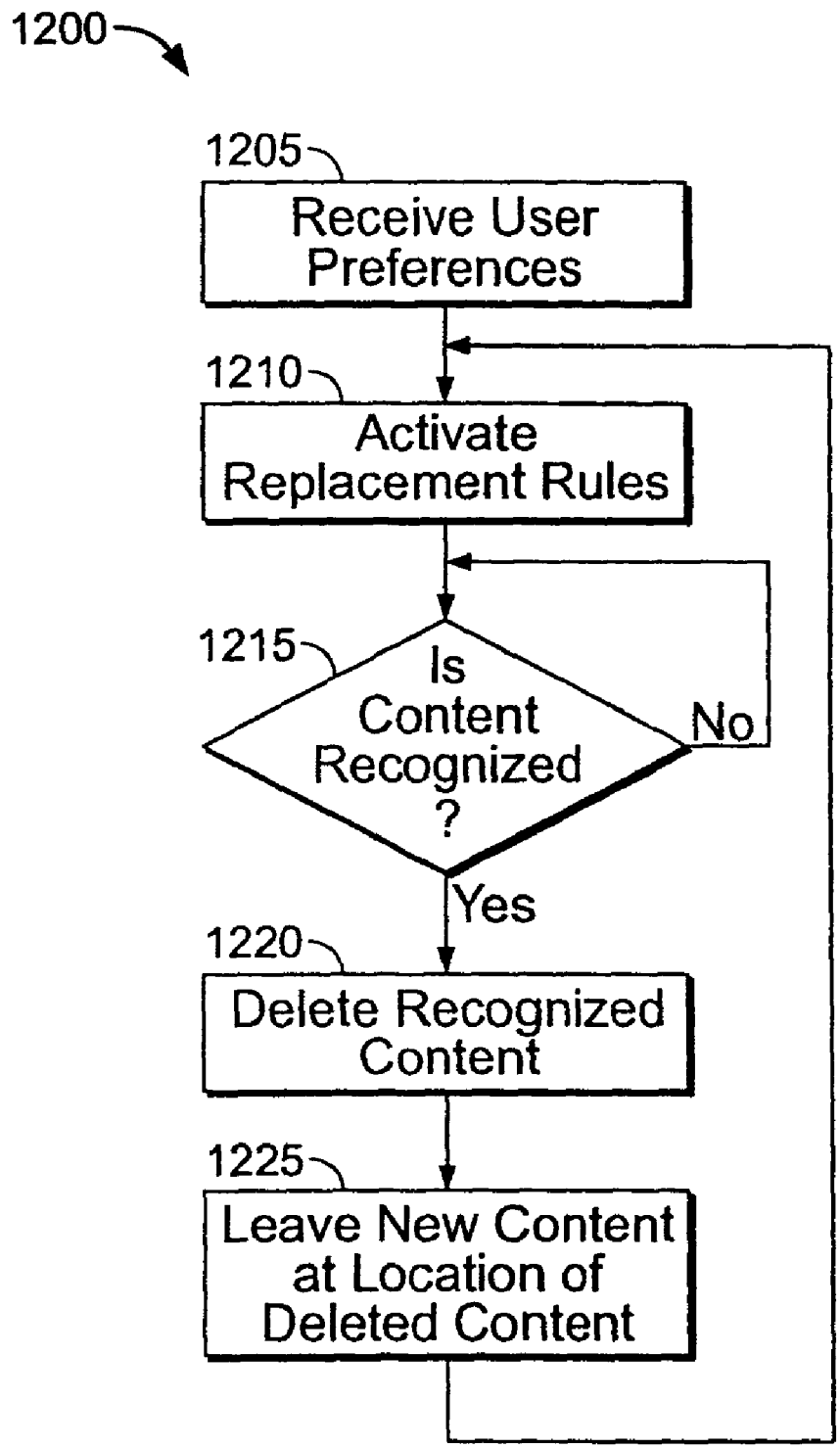

For example, as shown in FIG. 12, the observation program 405 may perform a procedure 1200 to directly insert alternative predetermined content into the file without the use of a designator string. Examples of replacement rules for this embodiment are:

"If address65 is detected and if userID=00021, remove content from address65 and insert content484."

"If originator499 is detected and if userID=99232, remove content from originator499 and insert content from originator3."

In the procedure of FIG. 12, the observation program 405 receives user preferences (step 1205), activates replacement rules (step 1210), determines if predetermined content is present (step 1215), and deletes the predetermined content (step 1220). Then the observation program inserts new content into the location of the deleted content (step 1225).

The observation program 405 may gather statistical information relating to content accessed by the user. This statistical information may be user or affinity group specific. The statistical information may then be published or offered for sale to interested organizations.

The system 400 may be used by a content provider that is supported by a service provider to replace a certain percentage of advertisements with advertisement relating to the service provider. In exchange, the service provider agrees to accept such advertising as a form of payment from the content provider for access to network links such as T1 or T3 lines, DSL, or cable modems.

The system 400 may be used to insert a hyperlink for a term in a document. For example, if a document accessed by the user includes the word "sports", the observation program 405 could insert or append to the word a hyperlink to content relating to sports, for example a hyperlink to the CNN sports section. Thus, whenever the word "sports" appears in a web page, the observation program 405 would append or insert the hyperlink www.cnn.com/cnnsi. The observation program 405 would insert such hyperlinks based on the user preferences. For example, if the user indicated an interest in sports or an interest in sports from CNN, then the observation program 405 would create a replacement rule such as "if 'sports' is detected and if userID=54232, add link to www.cnn.com/cnnsi.

What is claimed is:

1. An observation program stored in a non-transitory computer-readable storage medium, comprising instructions to cause a processor to:

receive content which includes at least one term;

generate a replacement rule based on a user preference, the replacement rule comprising a term to be replaced and a hyperlink relating to said term to be replaced;

identify each instance of the term to be replaced in the at least one term of the received content; and replace said each instance of the term to be replaced with the hyperlink according to the replacement rule, wherein the replacement rule comprises an identifier associated with the user and wherein said each instance of the term to be replaced is replaced with the hyperlink based, at least in part, on the identifier associated with the user of the content.

2. The observation program of claim 1, wherein the content is a document.

3. The observation program of claim 1, wherein the content is a web page.

4. The observation program of claim 1, wherein the observation program further comprises instructions to cause the processor to display the content to the user after said each instance of the term to be replaced has been replaced.

* * * * *

UNITED STATES PATENT AND TRADEMARK OFFICE
CERTIFICATE OF CORRECTION

| | | |
|---|---|---|
| PATENT NO. | : 7,949,791 B2 | Page 1 of 1 |
| APPLICATION NO. | : 12/392961 | |
| DATED | : May 24, 2011 | |
| INVENTOR(S) | : Frank David Serena | |

It is certified that error appears in the above-identified patent and that said Letters Patent is hereby corrected as shown below:

On the Title page of the patent, at Item (73), after "Tokyo (JP)" delete "; Sony Pictures Entertainment Inc., Culver City, CA (US)".

Signed and Sealed this
Twenty-first Day of August, 2012

David J. Kappos
*Director of the United States Patent and Trademark Office*